Patented Apr. 5, 1932

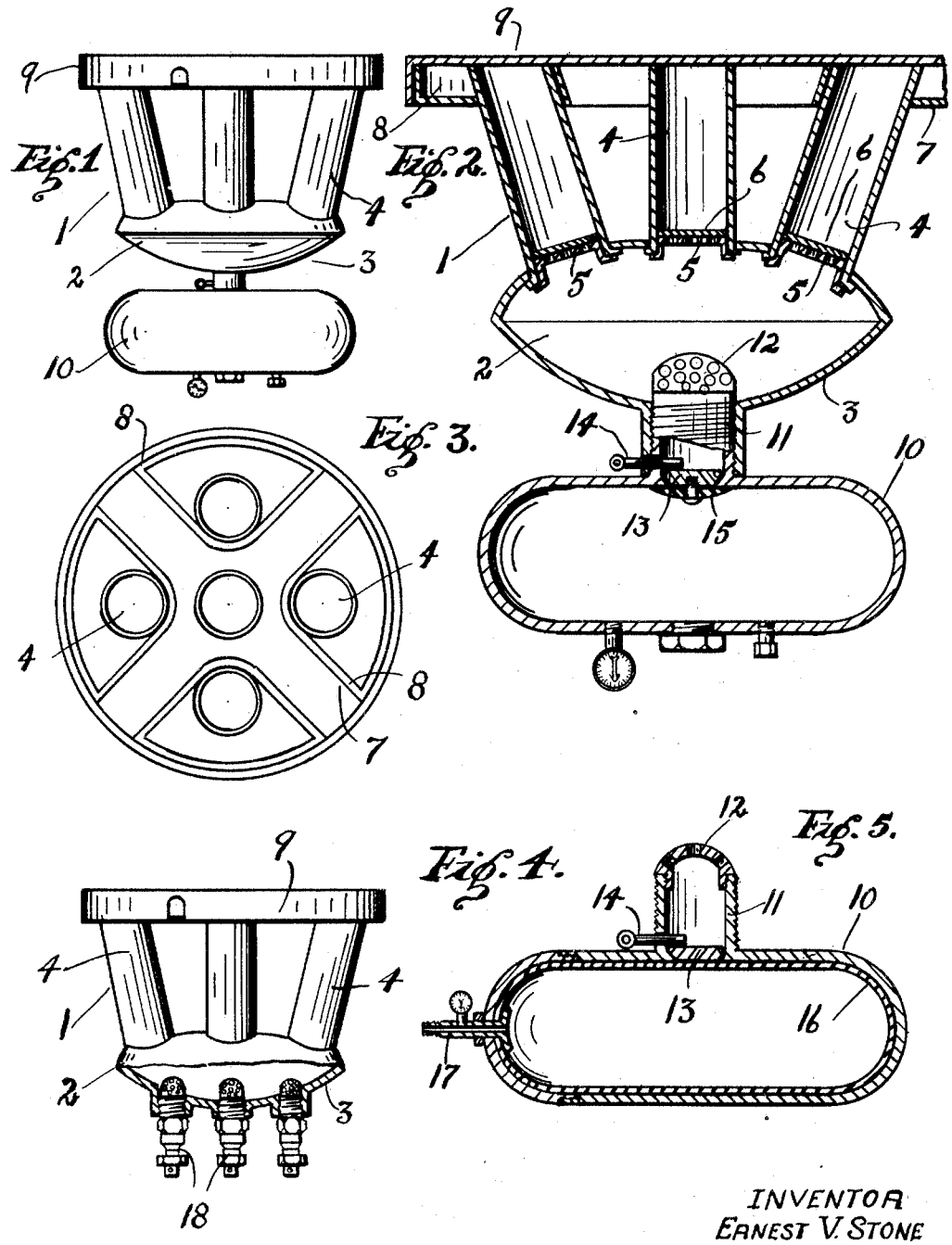

1,852,439

UNITED STATES PATENT OFFICE

ERNEST V. STONE, OF LONG BEACH, CALIFORNIA

MULTITUBE PARACHUTE EJECTOR

Application filed October 19, 1929. Serial No. 400,851.

This invention relates to a parachute ejector particularly applicable for airplanes, aviators or similar uses.

An object of my invention is to provide a multi-tube parachute ejector which will expand the parachute as it is thrown from the ejector.

Another object is to provide a parachute ejector of the character stated which will quickly expand the parachute and will place the shroud lines taut so that the parachute will support the object almost instantaneously after ejection.

Still another object is to provide an ejector of the character stated which will place the parachute in effective operative position without requiring the object attached to the parachute to fall a considerable distance.

Other objects, advantages and features of invention may appear from the accompanying drawings, the subjoined detailed description and the appended claims.

In the drawings

Figure 1 is a side elevation of my ejector.

Figure 2 is a longitudinal sectional view of the same on a slightly enlarged scale.

Figure 3 is a plan view with the cover removed.

Figure 4 is a side elevation with parts broken away showing a cartridge means of ejecting the parachute.

Figure 5 is a longitudinal sectional view of a modified form of air container.

Referring more particularly to the drawings, my parachute ejector 1 which includes a case or chamber 2, the lower wall 3 of which is curved so as to deflect the energy of the gases upwardly as will be further described. A plurality of tubes or cylinders 4 rise from the chamber 2 and these cylinders are outwardly divergent for the purpose of effectively extending the parachute when it is ejected therefrom. There may be any desired number of these cylinders provided, and the number depends somewhat upon the size of the parachute used. The parachute (not shown) is placed in the various tubes 4, that is, a part of the parachute is tucked into each of the tubes, thus when the chute is ejected each portion thereof is sent in a different direction, so that the result of the entire ejection will be to thoroughly spread the parachute into operative position.

Adjacent the bottom of each of the tubes 4, I provide a perforated plate 5, and above each plate and fitting closely in the tube is a piston 6 formed of leather or any other suitable fibrous material. The purpose of the piston is to prevent damage to the parachute and it also acts to more effectively eject the parachute from each of the tubes because the force of the gas in the chamber 2 will act against the piston and will not be dissipated as would be the case if there were no piston.

Adjacent the upper ends of the tubes 4 and secured thereto, I provide a plate 7. Partially surrounding each of the outer tubes 4 are rope chambers 8, the bottom wall of which is the plate 7. The shroud ropes of the parachute are coiled in these last named chambers so that they may readily uncoil when the parachute is ejected. A cover 9 fits over the entire assembly of tubes and fits closely about the rope chambers 8 so that all moisture is excluded from the tubes and the rope chamber. The force of the gases which are expelled into the chamber 2 is sufficient to blow the cover 9 off without materially retarding the expulsion of the parachute.

Gases may be admitted into the chamber 2 in a number of different ways, and I have here shown a compressed air cylinder 10 which screws into the bottom of the chamber 2. The outlet neck 11 of the air cylinder is perforated as at 12 at the top thereof so that the air will be dissipated into every part of the chamber 2. A valve 13 is pivotally mounted in the neck 11 and is held against motion by a retractable pin 14. A thin rubber disc 15 is secured to the valve 13 and fits over the opening to the neck 11 so as to effectively seal this opening and prevent the leakage of air therethrough. When the pin 14 is retracted there is sufficient pressure in the cylinder 10 to push the disc 15 into the neck 11, thus permitting the escape of the air in the cylinder into the chamber 2 where it acts upon each of the pistons 6 to drive the parachute upwardly away from the ejector.

In Figure 5 I have shown a slightly modified form of air cylinder in that I have omitted the rubber disc 15, and substituted an inner tube 16. The valve-stem 17 of which protrudes from one end of the cylinder. The expelling pressure in the chamber 2 may also be provided by a plurality of cartridge retaining barrels 18 which screw into the bottom of the wall 3. A powder cartridge is provided in each of the barrels and is exploded when the parachute is to be ejected.

Having described my invention, I claim:

1. A parachute ejector comprising a chamber, a plurality of outwardly divergent tubes rising from said chamber, a portion of the parachute being placed in each of the tubes a piston in each of the tubes, and means extending into the chamber whereby pressure is exerted therein to expel the parachute from all of the tubes.

2. A parachute ejector comprising a chamber, a plurality of outwardly divergent tubes rising from said chamber, a portion of the parachute being placed inside of each of the tubes, and means extending into the chamber whereby pressure is exerted therein to expel the parachute simultaneously from all of the tubes, rope chambers about said tubes and a cover extending over all of said tubes.

3. A parachute ejector comprising a chamber, an air cylinder extending into said chamber, valve means in the air cylinder whereby the air in said cylinder is released into the chamber and a plurality of outwardly divergent tubes rising from the chamber, a portion of the parachute being placed inside of each of the tubes, rope chambers adjacent the tubes and a cover extending over all of the tubes.

4. A parachute ejector comprising a chamber, a plurality of outwardly divergent tubes rising from said chamber, a portion of the parachute being placed inside of each of the tubes, and means extending into the chamber whereby pressure is exerted therein to expel the parachute from all of the tubes, and a piston in each of said tubes, rope chambers adjacent said tubes adapted to receive the parachute shroud lines.

5. A parachute ejector comprising a chamber, the lower wall of said chamber being curved convexly, an air cylinder, a neck rising from the cylinder, said neck being screwed into the lower wall of the chamber, said outlet neck being perforated within the chamber, valve means in said neck, and a plurality of outwardly divergent tubes rising from the chamber, a portion of the parachute being placed inside of each of the tubes.

6. A parachute ejector comprising a chamber, the lower wall of said chamber being curved convexly, an air cylinder, a neck rising from the cylinder, said neck being screwed into the lower wall of the chamber, said outlet neck being perforated within the chamber, valve means in said neck, and a plurality of outwardly divergent tubes rising from the chamber, a portion of the parachute being placed inside of each of the tubes, rope chambers adjacent the tubes, a cover extending over all of the tubes and a piston in each of the tubes.

In testimony whereof, I affix my signature.

ERNEST V. STONE.